(12) United States Patent
Lu et al.

(10) Patent No.: US 12,158,759 B2
(45) Date of Patent: Dec. 3, 2024

(54) DOCKING METHOD

(71) Applicant: SUZHOU RADIANT PHOTOVOLTAIC TECHNOLOGY CO., LTD., Jiangsu (CN)

(72) Inventors: Jianxiang Lu, Jiangsu (CN); Zhixiang Wang, Jiangsu (CN); Huiming Cao, Jiangsu (CN); Xianshan Qi, Jiangsu (CN); Jianrong Xu, Jiangsu (CN); Fei Xu, Jiangsu (CN)

(73) Assignee: SUZHOU RADIANT PHOTOVOLTAIC TECHNOLOGY CO., LTD., Jiangsu (CN)

(*) Notice: Subject to any disclaimer, the term of this patent is extended or adjusted under 35 U.S.C. 154(b) by 787 days.

(21) Appl. No.: 17/287,155

(22) PCT Filed: Nov. 9, 2019

(86) PCT No.: PCT/CN2019/116913
§ 371 (c)(1),
(2) Date: Apr. 21, 2021

(87) PCT Pub. No.: WO2020/094144
PCT Pub. Date: May 14, 2020

(65) Prior Publication Data
US 2021/0389774 A1    Dec. 16, 2021

(30) Foreign Application Priority Data
Nov. 9, 2018  (CN) .......................... 201811333608.0

(51) Int. Cl.
*G05D 1/00*    (2024.01)

(52) U.S. Cl.
CPC ......... *G05D 1/0225* (2013.01); *G05D 1/0217* (2013.01); *G05D 1/0246* (2013.01)

(58) Field of Classification Search
None
See application file for complete search history.

(56) References Cited

U.S. PATENT DOCUMENTS 9,126,341 B1    9/2015  Meller et al.
10,232,505 B2 *  3/2019  Tadayon .................... B25J 5/02
(Continued)

FOREIGN PATENT DOCUMENTS

CN    106938269 A    7/2017
CN    107139172 A    9/2017
(Continued)

*Primary Examiner* — Jaime Figueroa
*Assistant Examiner* — Arslan Azhar
(74) *Attorney, Agent, or Firm* — Rivka Friedman

(57) ABSTRACT

A docking method for docking a cleaning robot between a plurality of solar panels includes a docking area setting step, an approaching cleaning area step, a docking platform adjustment step, a cleaning robot first control step, and a leaving cleaning area step. The present invention uses a cleaning robot to complete cleaning on the solar panels or a solar panel array, a docking robot to transfer the cleaning robot between the solar panels or multiple solar panel arrays, and a data processing system to realize dispatching and controlling of the cleaning robot and the docking robot, so that a number of cleaning robots and docking robots can be dispatched properly according to a number of the solar panels needing to be cleaned, and a cleaning operation on all solar panels and panel arrays can be completed in a photovoltaic power station in a shortest time.

9 Claims, 9 Drawing Sheets

(56) References Cited

U.S. PATENT DOCUMENTS

2013/0037051 A1     2/2013  Eitelhuber
2018/0311822 A1*   11/2018  Kaminka ............... B25J 9/1682
2019/0009313 A1*    1/2019  Choori .................... H02J 3/381

FOREIGN PATENT DOCUMENTS

| CN | 107544519 A   | 1/2018 |              |
|----|---------------|--------|--------------|
| CN | 206854321 U   | 1/2018 |              |
| CN | 107971266 A   | 5/2018 |              |
| CN | 108259000 A   | 7/2018 |              |
| CN | 108602189 A   | 9/2018 |              |
| CN | 109361352 A   | 2/2019 |              |
| CN | 109375623 A   | 2/2019 |              |
| EP | 2559956 A1 *  | 2/2013 | ............... F24J 2/461 |
| KR | 101140684 B1  | 5/2012 |              |
| KR | 101688122 B1  | 12/2016|              |

\* cited by examiner

DOCKING METHOD

BACKGROUND OF INVENTION

1. Field of Invention

The present invention relates to a docking method for docking a cleaning robot between solar panels.

2. Related Art

With the decreased amount of fossil fuels, solar energy, as an emerging renewable energy source, has become an important part of human energy use. In the past ten years, solar energy application technology has developed worldwide and rapidly.

Since solar panels can only work outdoors, the most serious problem affecting their work is not wind, rain, and thunder, but dust and snow accumulated all year round. Dust or other articles attached to the solar panels will adversely affect light transmittance of the solar panels and hinder photoelectric efficiency, thereby seriously affecting efficiency of the solar panels to directly obtain sunlight, and reducing energy absorption and conversion efficiency of the solar panels, as well as efficiency of power generation.

Therefore, surfaces of the solar panels in each of photovoltaic power stations needs to be cleaned. It is obvious that manual cleaning is inefficient and risky. Accordingly, industries have developed a solar panel cleaning robot to clean the surfaces of the solar panels, which can effectively improve a cleaning efficiency without potential personal safety hazards associated with high-level cleaning operations.

Since solar panels or panel arrays are not arranged in a complete block, but in multiple locations in a certain area, there is a large space between solar panels or panel arrays at different positions in the area. As a result, cleaning robots cannot directly cross intervals in the area on different solar panels. In addition, if a cleaning robot is provided on each of the solar panels, not only is a hardware cost too high, but usage efficiency of each of the cleaning robot is too low, resulting in greater waste of resources.

Based on the above problems, there is a need to invent an intelligent cleaning system, including a cleaning device, a docking apparatus, and a data processing system. The cleaning device can complete effective cleaning on a single solar panel or panel array. The docking apparatus can transfer the cleaning robot from one solar panel array to another solar panel array. The data processing system can remotely dispatch and control the cleaning robot to efficiently complete a cleaning work on different panel arrays.

SUMMARY OF INVENTION

An object of the present invention is to provide a docking method to solve a technical problem of transferring and dispatching of cleaning robots between a plurality of solar panel arrays.

In order to achieve the above-mentioned object, the present invention provides a docking method, comprising a docking area setting step of setting a first docking area located outside each of a plurality of cleaning areas and adjoining a side of the cleaning area, and setting a second docking area located in the cleaning area, adjoining the side of the cleaning area, and corresponding to the first docking area; an approaching cleaning area step of dispatching a docking robot to the first docking area adjoining the cleaning area; a docking platform initial adjustment step of adjusting an angle and/or a height of a docking platform to allow an upper surface of the docking platform to be flush with an upper surface of a panel located in the cleaning area, and allow an entrance of a docking apparatus to face the second docking area; a cleaning robot first control step of controlling a cleaning robot to pass through the entrance from the first docking area to the second docking area, or from the second docking area to the first docking area; a docking platform further adjustment step of adjusting the angle and/or the height of the docking platform to make the upper surface of the docking platform be in a horizontal state; and a leaving cleaning area step of controlling the docking robot to leave the first docking area.

Further, prior to the cleaning robot first control step, the docking method further comprises an in-position signal sending step of sending an in-position signal indicating the docking robot arrives in position to a data processing system, and a second instruction sending step of sending a second travel instruction by the data processing system to the cleaning root.

Further, the approaching cleaning area step comprises an instruction obtaining step of obtaining a travel control instruction including a destination position and a recommended route of a transfer path of the docking robot; a station step of controlling the docking robot to travel along the recommended route to the destination position located in the first docking area; a distance obtaining step of obtaining a current distance between the docking robot and a border of the cleaning area, and determining whether the current distance is greater than a predetermined distance threshold; and a position adjustment step of controlling the docking robot to turn right at a steering angle and travel forward at an advance distance, and then turn left at the steering angle and travel back at a rearward distance to travel to the first docking area based on the current distance greater than the predetermined distance threshold, wherein the advance distance is determined by an equation set forth as $(S-S0)/\sin A$, and the rearward distance is determined by an equation set forth as $(S-S0)/tgA$, in which S represents the current distance, S0 represents the predetermined distance threshold, and A represents the steering angle, and controlling the docking robot to turn left at the steering angle and travel forward at the advance distance, and then turn right at the steering angle and travel back at the rearward distance to travel to the first docking area based on the current distance less than the predetermined distance threshold, wherein the advance distance is determined by an equation set forth as $(S0-S)/\sin A$, and the rearward distance is determined by an equation set forth as $(S0-S)/tgA$.

Further, prior to the position adjustment step, the approaching cleaning area step further comprises a distance signal sending step of sending a signal of the current distance to a data processing system, and a first instruction sending step of sending a first travel instruction to the cleaning robot.

Further, prior to the cleaning robot first control step, based on the cleaning robot needing to travel from the second docking area to the first docking area, the docking method further comprises a cleaning robot position determination step of determining whether the cleaning robot is in the second docking robot, and a cleaning robot position adjustment step of adjusting a position of the cleaning robot to be positioned in the second docking area based on the cleaning robot which needs not to travel form the second docking are to the first docking area.

Further, the cleaning robot position determination step comprises a picture obtaining step of obtaining a real-time picture including a graphic identifier provided on the cleaning robot; a deviation value calculation step of calculating a deviation value between a position of the graphic identifier in the real-time picture and a preset position of the graphic identifier; and a deviation determination step of determining that the cleaning robot has reached the second docking area based on an absolute value of the deviation value being less than a predetermined threshold, and determining that the cleaning robot deviates from the second docking area based on an absolute value of the deviation value being greater than or equal to the predetermined threshold.

Further, the cleaning robot position adjustment step comprises a deviation direction determination step of determining a deviation direction of the cleaning robot according to the deviation value; a graphical identifier determination step of determining whether the graphic identifier is located on a front surface or a rear surface of the cleaning robot; and a cleaning robot second control step of controlling the cleaning robot to turn right at a steering angle and travel back at a first distance, and then turn left at the steering angle and travel forward at a second distance to travel to the second docking area based on the cleaning robot deviating to the left and the graphic identifier located on the front surface of the cleaning robot; controlling the cleaning robot to turn right at the steering angle and travel forward at the first distance, and then turn left at the steering angle and travel back at the second distance to travel to the second docking area based on the cleaning robot deviating to the left and the graphic identifier located on the rear surface of the cleaning robot; controlling the cleaning robot to turn left at the steering angle and travel back at the first distance, and then turn right at the steering angle and travel forward at the second distance to travel to the second docking area based on the cleaning robot deviating to the right and the graphic identifier located on the front surface of the cleaning robot; and controlling the cleaning robot to turn left at the steering angle and travel forward at the first distance, and then turn right at the steering angle and travel back at the second distance to travel to the second docking area based on the cleaning robot deviating to the right and the graphic identifier located on the rear surface of the cleaning robot, wherein the first distance is determined by an equation set forth as $E/\sin F$, and the second distance is determined by an equation set forth as $E/tgF$, in which F represents the steering angle.

Further, prior to the cleaning robot second control step, the docking method further comprises a cleaning robot data release step of sending the deviation direction of the cleaning robot and a location of the graphic identifier on the cleaning robot to a data processing system, and a third instruction sending step of sending a third travel instruction to the cleaning robot through the data processing system.

Further, after the docking platform initial adjustment step, the docking method further comprises a mating step of mating the docking platform to the second docking area of the cleaning area, and after the docking platform further adjustment step, the docking method further comprises an undocking step of separating the docking platform from the second docking area of the cleaning area.

Further, in the mating step, a bridge board provided by the docking robot extends from the docking robot to connect the upper surface of the docking platform to the upper surface of the panel in the cleaning area, and in the undocking step, the bridge board is retracted so that the upper surface of the docking platform is separated from the upper surface of the panel in the cleaning area.

The present invention has advantages as follows: the present invention provides a docking method for docking a cleaning robot between a plurality of solar panels of which the cleaning robot is employed to complete cleaning on a solar panel or a solar panel array, a docking robot is employed to transfer the cleaning robot between a plurality of solar panel arrays, and a data processing system is used to realize dispatching and controlling of the cleaning robot and the docking robot, so that the present invention can dispatch an appropriate number of cleaning robots and docking robots according to a number of solar panels needing to be cleaned, thereby to complete a cleaning operation on all solar panels and panel arrays in a photovoltaic power station in a shortest time.

DESCRIPTION OF PREFERRED EMBODIMENTS

Figure 1:
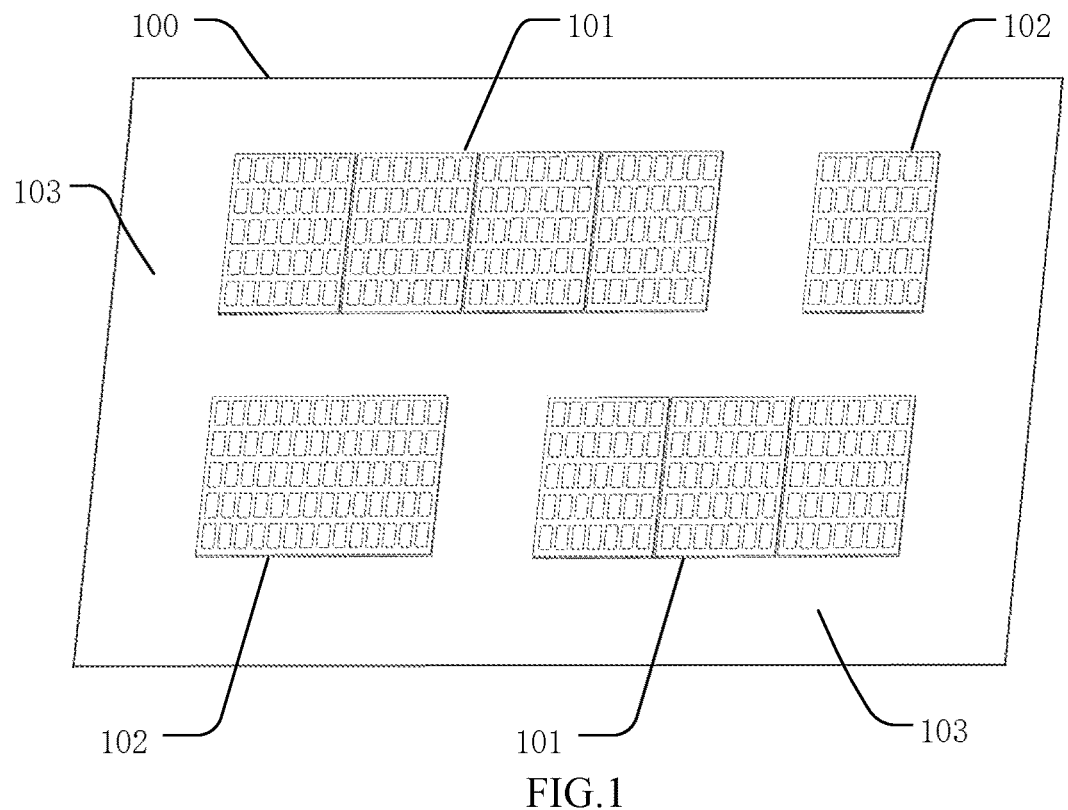
FIG. 1 is a schematic view showing a work area of an embodiment of the present invention.

The preferred embodiments of the present invention given below will be introduced with reference to the accompanying drawings of the specification, so as to demonstrate that the present invention can be implemented by examples. These embodiments can completely introduce the technical content of the present invention to those skilled in the art, and make the technical content of the present invention clearer and easier to understand. However, the present invention can be embodied by many different forms of embodiments, and the protection scope of the present invention is not limited to the embodiments mentioned in the text.

In the drawings, components with same structures are represented by same numerals, and components with similar structures or functions are represented by similar numerals. When a component is described to be "connected to" another component, the two can be understood as directly "connected", or one component is "connected" to the other component through an intermediate component.

As shown in FIG. 1, a solar power station is provided with a work area 100, which includes a plurality of solar panel arrays 101 (arrays for short). Each of the solar panel arrays 101 is arranged at a tilt angle with respect to a horizontal plane at an angle value from 15 degrees to 45 degrees to ensure that more sunlight directly hits solar panels. In most solar power stations, a tilt angle of each of the solar panels with respect to the horizontal plane (referred to as panel tilt angle or tilt angle) is the same. In a number of solar power stations, different solar panels may be arranged at different tilt angles, and tilt angles of certain panels may even be adjustable or variable.

As shown in FIG. 1, each of the solar panel arrays 101 includes a plurality of spliced solar panels 102 (referred to as panels). A plurality of the solar panel arrays 101 and/or a plurality of the solar panels 102 may be arranged in a matrix. A passage area 103 is formed between any adjacent two of the solar panel arrays 101 or solar panels 102. In this embodiment, a plurality of cross-connected passage areas 103 together form a crisscross path network.

Figure 2:
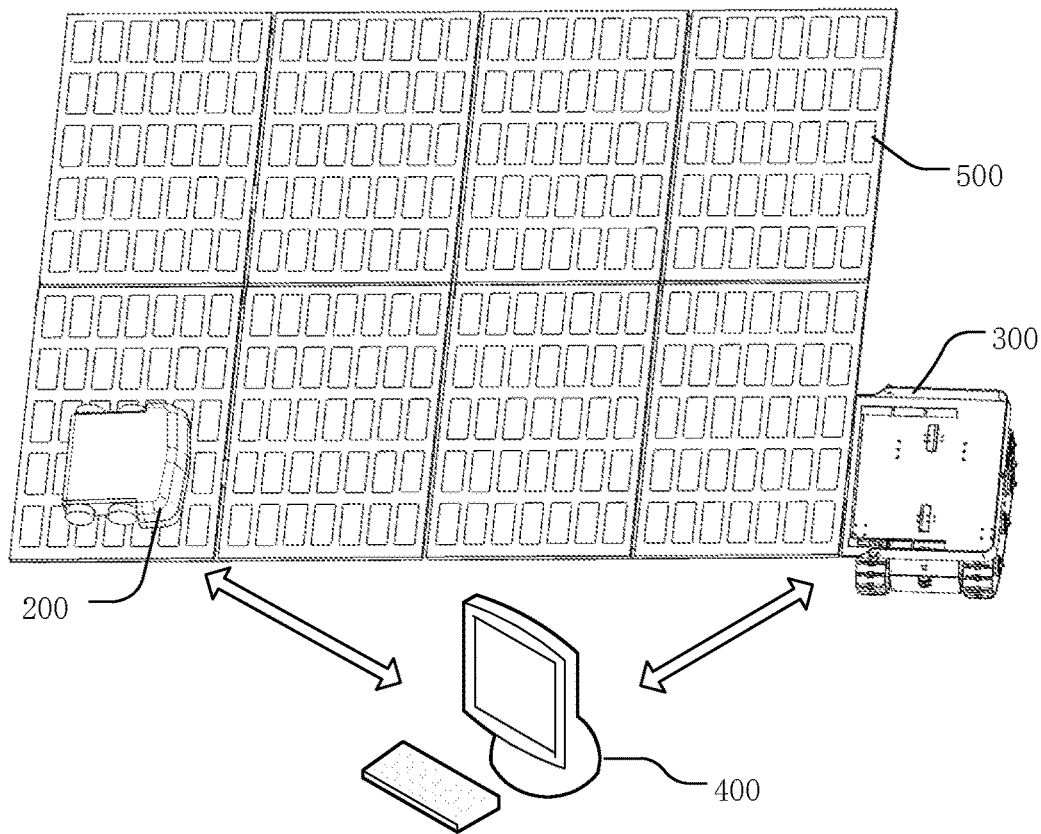
FIG. 2 is a schematic view of a cleaning system in a working state of an embodiment of the present invention.
Figure 3:
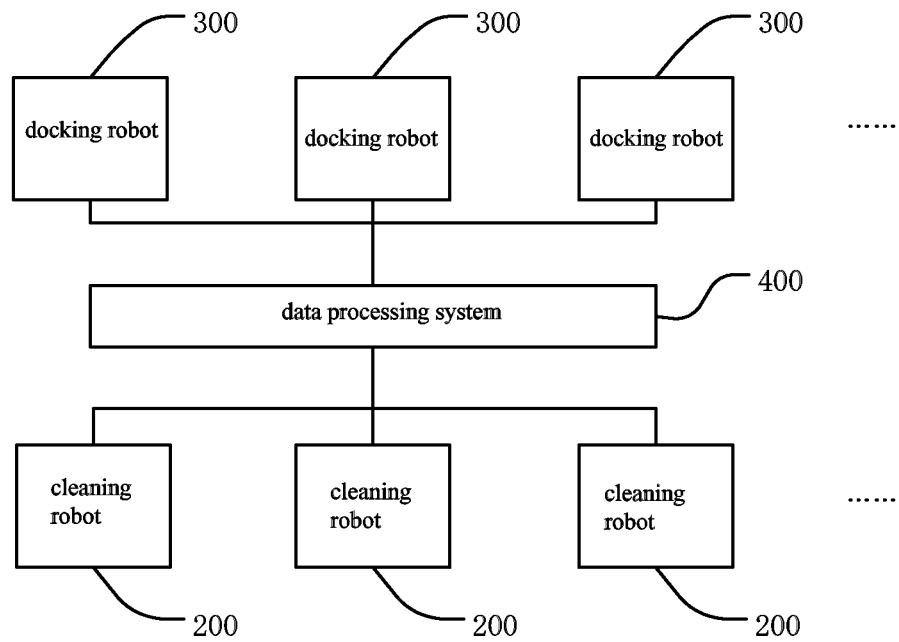
FIG. 3 is a schematic structural view of the cleaning system of an embodiment of the present invention.

As shown in FIGS. 2-3, an embodiment of the present invention provides a cleaning system, including a cleaning robot 200, a docking robot 300, and a data processing system 400, and a work area 100 is an area where the cleaning robot 200 and the docking 300 complete a solar panel cleaning operation.

During a normal operation of a solar power station, some solar panels or solar panel arrays will be contaminated with dust or stains and need to be cleaned. Each of the solar panels or the solar panel arrays that needs to be cleaned is defined as a cleaning area 500. The cleaning robot 200 can complete cleaning operations on the solar panel or the solar panel array in an effective way to clean every area on the panel or the panel array. The docking robot 300 can carry the cleaning robot 200 from a cleaning robot storage place to an upper surface of a cleaning area 500 (a panel or a panel array needing to be cleaned), or from an upper surface of a cleaned panel array to an upper surface of another cleaning area 500 (a panel or a panel array needing to be cleaned), or from a cleaned upper surface of the cleaning area 500 to the cleaning robot storage place.

Figure 4:
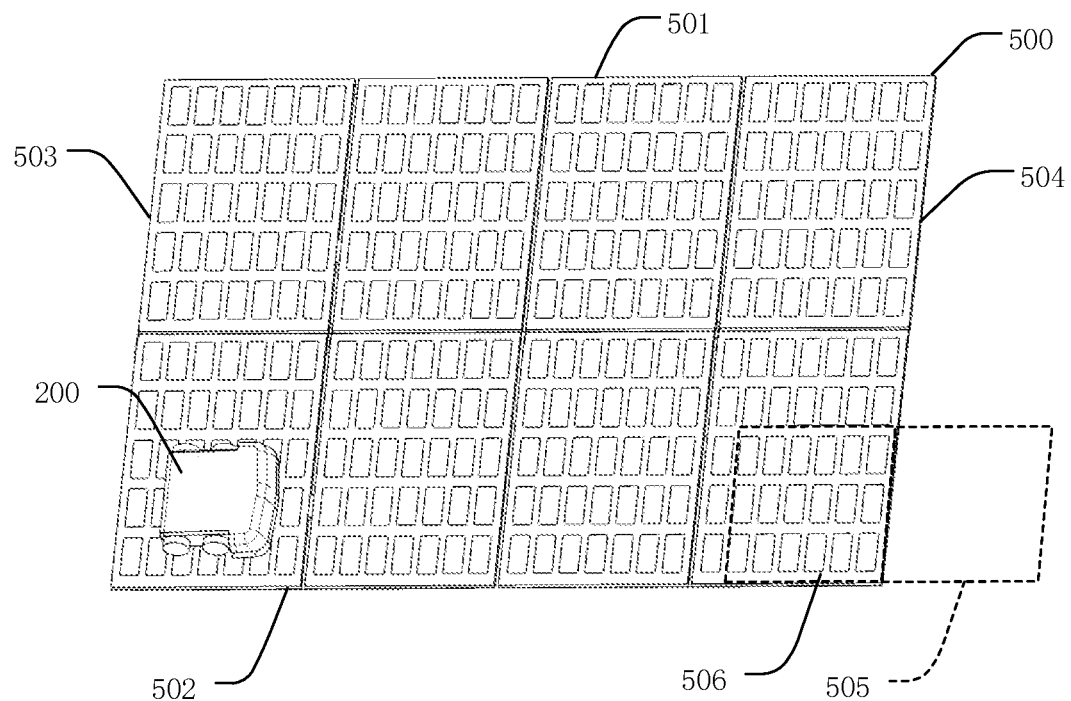
FIG. 4 is a schematic structural view of a cleaning area of an embodiment of present invention.

As shown in FIG. 4, each of the cleaning areas 500 is a group of composite rectangular panel arrays, peripheral edges of which are defined as a cleaning area upper end 501, a cleaning area lower end 502, a cleaning area left end 503, and a cleaning area right end 504, respectively.

When a cleaning robot 200 is carried by a docking robot 300 to the cleaning area 500, preferably, the cleaning robot 200 travels from the cleaning area left end 503 or the cleaning area right end 504 to the cleaning area 500. Similarly, when a cleaning robot 200 is transferred from a cleaning area 500 by a docking robot 300, preferably, the cleaning robot 200 travels from the cleaning area left end 503 or the cleaning area right end 504 to the docking robot 300.

As shown in FIG. 4, each of the cleaning areas 500 is provided with a first docking area 505 and a second docking area 506 disposed opposite to each other. The first docking area 505 and the second docking area 506 are located at two sides of the cleaning area left end 503, or two sides of the cleaning area right end 504, respectively. In this embodiment, the first docking area 505 is located outside the cleaning area 500 and adjoins a side of the cleaning area right end 504. The second docking area 506 is in the cleaning area 500 and adjoins another side of the cleaning area right end 504. Preferably, the first docking area 505 and the second docking area 506 are in close contact with the cleaning area right end 504, respectively.

To determine which solar panel arrays in photovoltaic power stations need to be cleaned, there are several common methods as follows. A first type of the methods is an area-divided estimation method. In a small area (areas can be randomly defined), the natural environment of the panel arrays adjacent to each other is similar, so a pollution degree of panels in a same area is also similar. Randomly select a solar panel, detect a pollution degree of the solar panel being selected, and determine whether the solar panel needs to be cleaned. If the panel needs to be cleaned, all the panels in the area need to be cleaned. If a work area of a solar power station covers a large area, a large work area can be divided into multiple small work areas, and sampling detection can be carried out in different areas. A second type of the methods is a periodical cleaning method. According to a natural environment of work areas, all the panel arrays in the work areas are cleaned regularly. If there is a lot of wind and sand in the work area or serious precipitation, surfaces of the solar panels have heavy attachments, so the solar panels may need to be cleaned 1 to 2 times a day. If there is less wind and sand in the work area, less attachments remain on the surfaces of the solar panels, so the solar panels may be cleaned every ten days. The above two methods both perform indiscriminate processing on multiple solar panel arrays, and are relatively inaccurate. As a result, there may be a possibility that some panels having fewer attachments on surfaces of the panels are also cleaned by cleaning robots. A third type of the methods is an individual detection method, inasmuch as a pollution degree of each of the panel arrays is carefully detected, so as to determine which of the panel arrays or panels need to be cleaned. Although this method is more accurate, it is less efficient.

As shown in FIG. 3, the data processing system 400, preferably a physical server or a cloud server, is connected to the cleaning robot 200 and/or the docking robot 300 to realize data exchange between the cleaning robot 200 and/or the docking robot 300, and to issue control instructions to the cleaning robot 200 and/or the docking robot 300, as well as obtaining feedback data, such as real-time position coordinates of the above two robots, image data collected by the two robots in real time, etc., from the cleaning robot 200 and/or the docking robot 300. Therefore, the data processing system 400 can enable fulfillment of a cleaning operation by the cleaning robot 200, realize a real-time monitoring of travelling and docking processes of the docking robot 300, control the docking robot 300 to travel as desired in the path network of the work area, and manage docking between the docking robot 300 and the panel array 101 in the cleaning area.

After obtaining information (panel serial numbers) about which panel array 101 needs to be cleaned, and based on a time allowed for cleaning operations in a photovoltaic power station, the data processing system 400 estimates a number of docking robots 300 and cleaning robots 200 required for the cleaning operations. The data processing system 400 calls a docking robot 300 to send a cleaning robot 200 to a certain panel array that needs cleaning. The cleaning robot 200 performs a comprehensive cleaning operation on the panel array. After the cleaning operation on the panel array is completed, the data processing system 400 calls another docking robot 300 to carry the cleaning robot 200 from an upper surface of the panel array that has been cleaned to an upper surface of another panel array that needs to be cleaned, or to the cleaning robot storage place.

The cleaning robot 200 is a product independently developed by the applicant. Please refer to a series of solar panel cleaning robot related patents applied by the applicant from 2016 to 2018. After being transferred to a solar panel array, the cleaning robot 200 can travel freely on the solar panel array, move around every corner of the solar panel array, and complete the cleaning operation on the entire panel array while traveling, of which details are not repeated herein.

Figure 5:
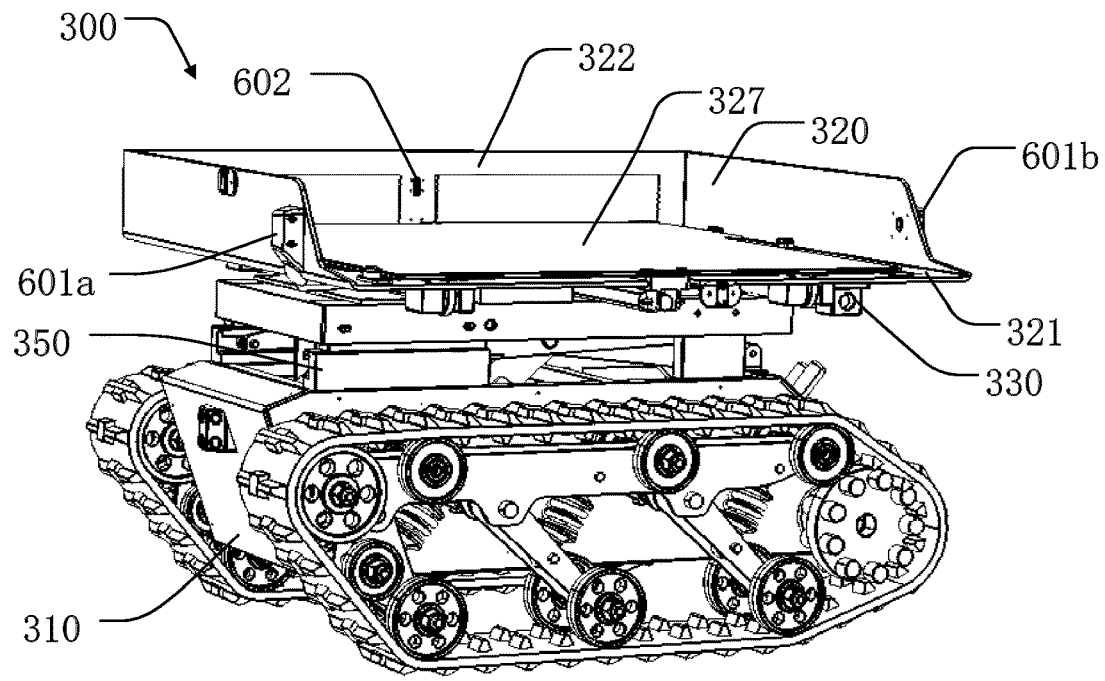
FIG. 5 is a schematic structural view of a docking robot with a docking platform in a flat state of an embodiment of present invention.

As shown in FIG. 5, an embodiment of the present invention provides a docking robot 300, including a vehicle 310, a docking apparatus 320, an angle adjustment apparatus 330, and a height adjustment apparatus 350.

Figure 6:
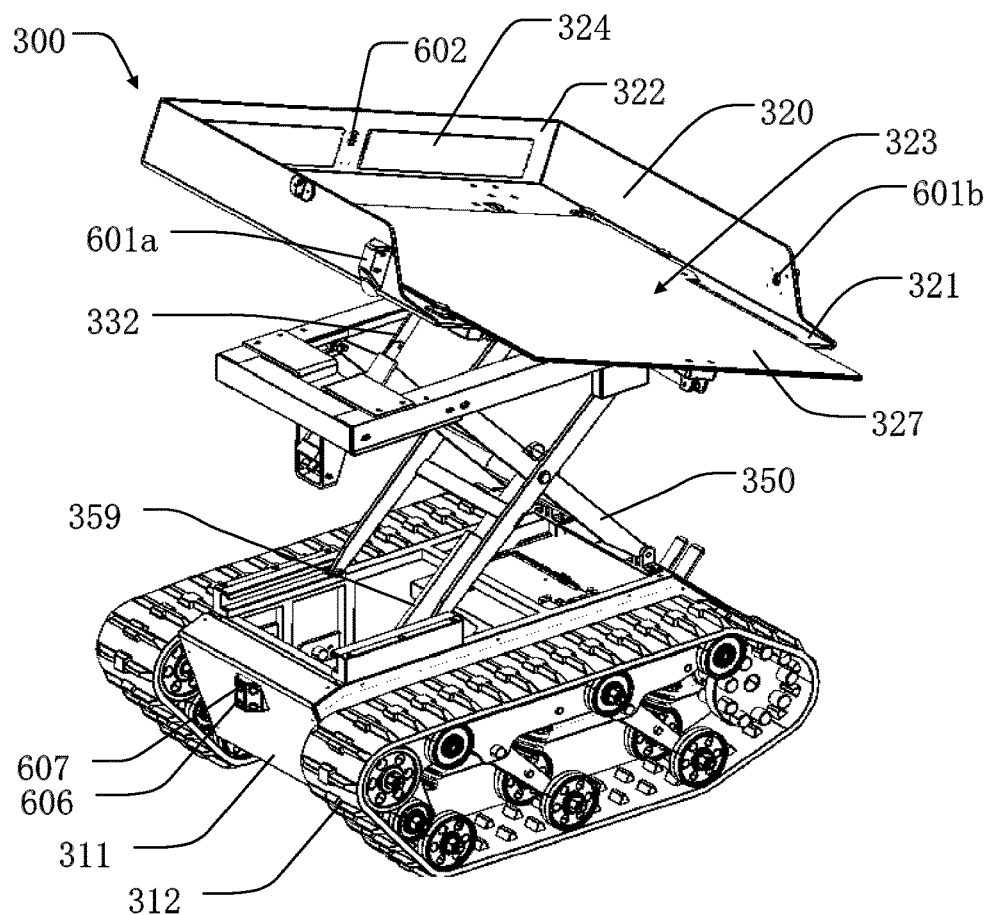
FIG. 6 is a schematic structural view of the docking robot with the docking platform in a tilt state of an embodiment of present invention.

As shown in FIGS. 5-6, the docking apparatus 320 includes a docking platform 321 for parking of the cleaning robot 200. The docking platform 321 is rotatably connected to a top or upper half part of the vehicle 310. During a docking process, the cleaning robot 200 travels from the upper surface of the docking platform 321 to an upper surface of a panel (on-board process), or from the upper surface of the panel to the upper surface of the docking platform 321 (off-board process).

Figure 7:
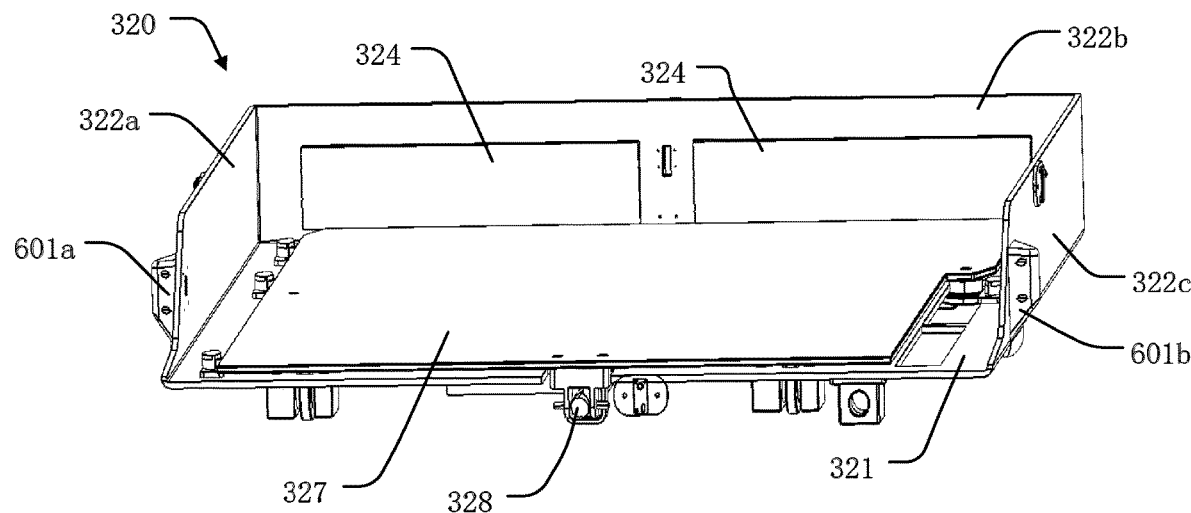
FIG. 7 is a schematic structural view showing a top of a docking apparatus of an embodiment of the present invention.
Figure 8:
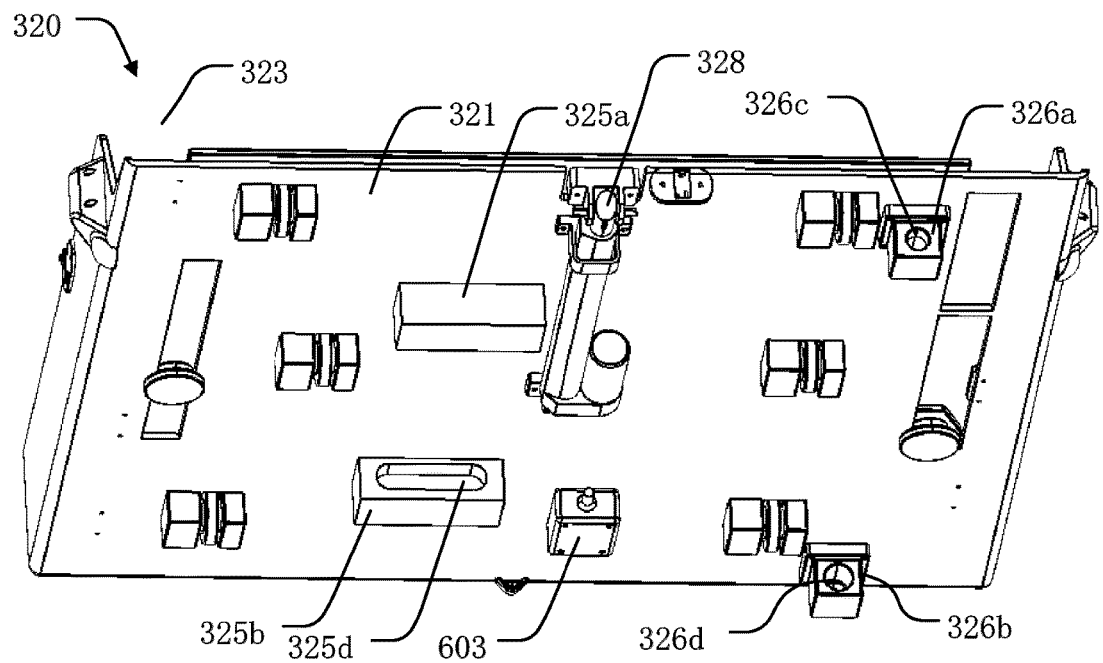
FIG. 8 is a schematic structural view showing a bottom of the docking apparatus of an embodiment of the present invention.
Figure 9:
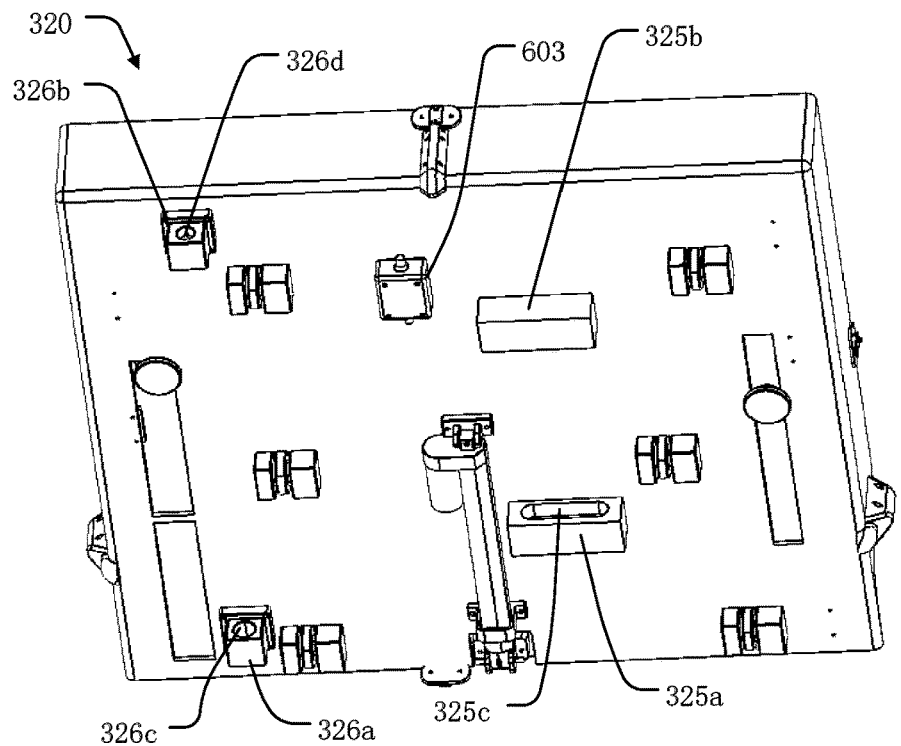
FIG. 9 is another schematic structural view showing the bottom of the docking apparatus of an embodiment of the present invention.

As shown in FIGS. 7-9, the docking apparatus 230 includes a block wall 322 protruding outward from an edge of the docking platform 321 and being perpendicular to the docking platform 321. The block wall 322 includes a left block wall 322a, a rear block wall 322b, and a right block wall 322c sequentially arranged and collectively enclosed to form a concave shape. An entrance 323 is formed between an opening end of the left block wall 322a and an opening end of the right block wall 322c.

The docking device 320 further includes an anti-collision component 324, preferably an anti-collision bar, disposed on an inner side wall of the rear block wall 322b. Optionally, inner sides of the left block wall 322a and/or the right block wall 322c may also be provided with the anti-collision bars (not shown).

The docking apparatus 320 further includes a bridge board 327 and a first telescopic rod 328. The bridge board 327 is slidably assembled to the upper surface of the docking platform 321. One end of the first telescopic rod 328 is connected to a lower surface of the docking platform 321, and the other end is connected to a lower surface of the bridge board 327. The first telescopic rod 328 is a hydraulic telescopic rod or an electric telescopic rod, and is equipped with a first telescopic rod controller 329. When receiving a command electrical signal, the first telescopic rod controller 329 can control the first telescopic rod 328 to adjust a length of the first telescopic rod 328. When the length of the first telescopic rod 328 is reduced to a shortest length, the bridge board 327 is located on the upper surface of the docking platform 321; when the length of the first telescopic rod 328 is extended, the bridge board 327 extends a distance toward the entrance 323. When a distance between the docking robot 300 and the solar panel array 101 reaches a smallest spacing, and an angle of the docking platform 321 is adjusted to be consistent with the solar panel array 101, the first telescopic rod 328 extends a certain distance, and the bridge board 327 extends toward the solar panel array 101, so that the docking platform 321 is connected to the solar panel array 101, and the cleaning robot 200 can smoothly travel from the docking platform 321 to the solar panel array 101 (i.e. cleaning area), or from the solar panel array 101 (i.e. cleaning area) to the docking platform 321. After the cleaning robot 200 is in position after transferring, the length of the first telescopic rod 328 is minimized, and the bridge board 327 is retracted to the upper surface of the docking platform 321.

As shown in FIGS. 7-9, the docking apparatus 320 further includes two sliding shaft bases 325a, 325b arranged oppositely and two rotating shaft bases 326a, 326b arranged oppositely.

The two sliding shaft bases 325a, 325b protrude outward from a middle of a bottom of the docking platform 321. There are provided two first sliding grooves 325c, 325d on two opposite surfaces of the two sliding shaft bases 325a, 325b, respectively. The two first sliding grooves 325c, 325d correspond to each other in shapes, sizes, and positions.

The two rotating shaft bases 326a, 326b protrude outward from the bottom of the docking platform 321 and are located adjacent to end portions at a right side of the docking platform 321. There are provided base through holes 326c, 326d at centers of the two rotating shaft bases 326a, 326b, respectively. The base through holes 326c, 326d correspond to each other in shapes, sizes, and locations.

As shown in FIG. 6, the vehicle 310 includes a vehicle body 311. left and right sides of the vehicle body 311 are provided with traveling devices 312 (such as wheels), respectively, preferably track wheel units, having good adaptability to road surfaces and good travelling performance.

Figure 10:
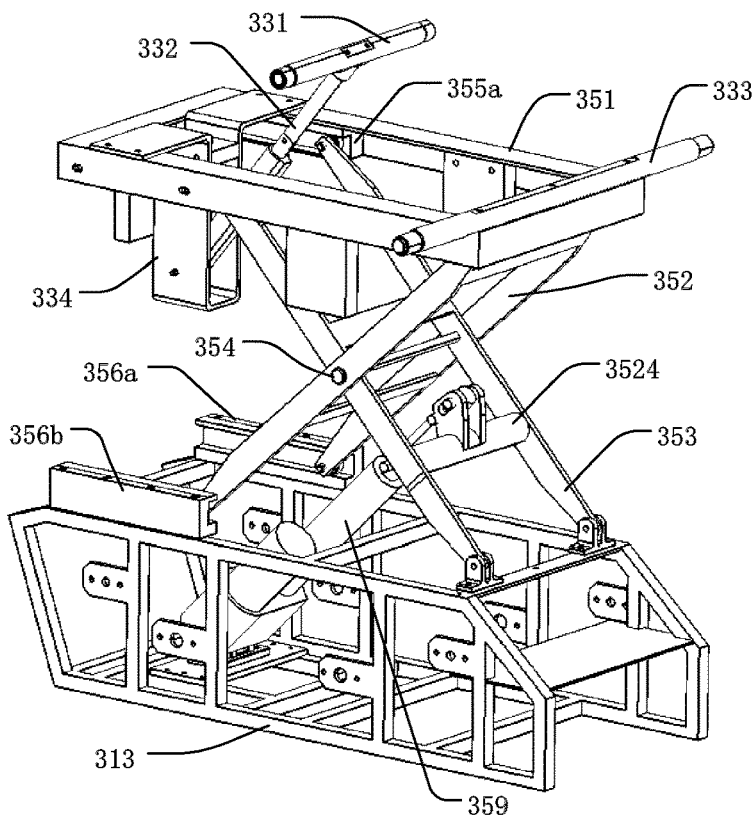
FIG. 10 is a schematic structural view of a height adjustment apparatus in an expanded state of an embodiment of the present invention.
Figure 11:
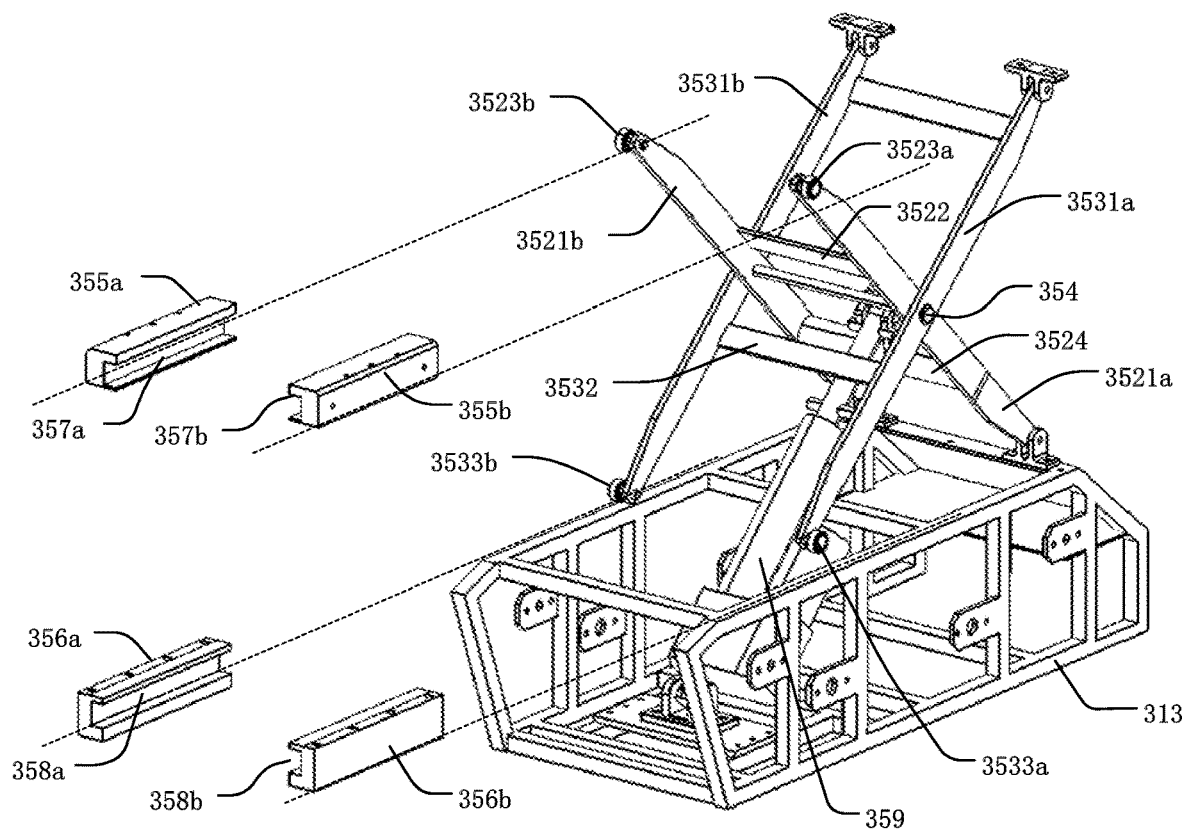
FIG. 11 is a schematic exploded structural view of the height adjustment apparatus in a retracted state of an embodiment of the present invention.
Figure 12:
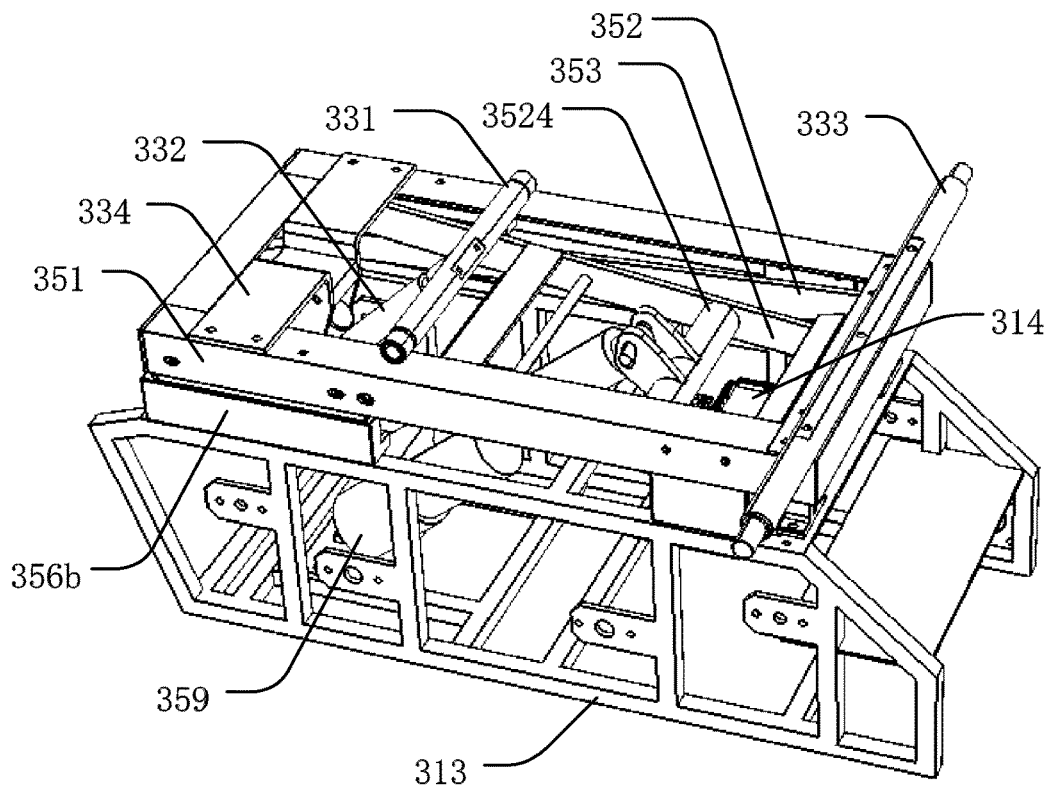
FIG. 12 is a schematic structural view of the height adjustment apparatus in a retracted state of an embodiment of the present invention.

As shown in FIG. 10, the vehicle body 311 includes a vehicle bracket 313, which is a three-dimensional frame whose overall shape and is substantially cuboid in shape. The vehicle bracket 313 includes a plurality of horizontally arranged transverse supports and a plurality of vertically arranged longitudinal supports. The longitudinal supports are perpendicular to a horizontal plane or maintain a certain angle with the horizontal plane. One or more baffles are fixed on a top, a side, or a bottom surface of the vehicle bracket 313, and the baffles and the vehicle bracket 313 jointly enclose the vehicle body 311. As shown in FIGS. 5-6 and FIGS. 10-12, the height adjustment apparatus 350 is disposed on a top or upper part of the vehicle 310, and the angle adjustment apparatus 330 is disposed on the height adjustment apparatus 350. The docking platform 321 is rotatably connected to a top of the angle adjustment apparatus 330 for controlling tilt angles of the docking platform 321. As shown in FIGS. 10-12, the angle adjustment apparatus 330 includes a sliding shaft 331, a second telescopic rod 332, a rotating shaft 333, and a telescopic rod mounting frame 334. The second telescopic rod 332 is a hydraulic telescopic rod or an electric telescopic rod, and the second telescopic rod 332 is equipped with a second telescopic rod controller 335. When receiving a command electrical signal, the second telescopic rod controller 335 can adjust a length of the second telescopic rod 332.

Both ends of the sliding shaft 331 can be slidably installed in the two first sliding grooves 325c and 325d. The telescopic rod mounting frame 334 is fixed to the height adjustment device 350. One end of the second telescopic rod 332 is rotatably connected to a middle of the sliding shaft 331, and the other end is rotatably connected to the telescopic rod mounting frame 334. A middle part of the rotating shaft 333 is fixedly connected to the height adjustment apparatus 350, with two ends of the rotating shaft 333 rotatably mounted to the base through holes 326c, 326d of the two rotating shaft bases 326a, 326b, so that the rotating shaft 333 is rotatable with respect to the rotating shaft bases 326a, 326b. When the length of the second telescopic rod 332 changes, the tilt angle of the docking platform 321 can be adjusted to be larger or smaller.

As shown in FIG. 5 to FIG. 6 and FIG. 10 to FIG. 12, the height adjustment device 350 includes a frame body 351, a first bracket 352, a second bracket 353, and a pin shaft 354. The docking apparatus 320 is rotatably connected to an end of the frame body 351. An upper end of the first bracket 352 is slidably connected to the frame body 351, and a lower end of the first bracket is rotatably connected to a top of the vehicle 310. An upper end of the second bracket 353 is rotatably connected to the frame body 351, and a lower end the second bracket is slidably connected to the top of the vehicle 310. The pin shaft 354 passes through a middle of the first bracket 352 and a middle of the second bracket 353, and the second bracket 353 is rotatably connected to the first bracket 352 via the pin shaft 354.

The height adjustment device 350 further includes two first guide rails 355a, 355b disposed oppositely and two second guide rails 356a, 356b disposed oppositely. The first guide rails 355a, 355b are horizontally mounted on the frame body 351. Two opposite surfaces of the two first guide rails 355a, 355b each are defined with two second sliding grooves 357a, 357b opposite to each other. The second guide rails 356a, 356b are horizontally mounted on the top of the vehicle 310. Two opposite surfaces of the two second guide rails each are defined with two third sliding grooves 358a, 358b opposite to each other.

In the angle adjustment apparatus 330, the telescopic rod mounting frame 334 is disposed under the frame body 351 and is connected to the frame body 351. A middle of the rotating shaft 333 is fixedly connected to an end of a top or an upper half of the frame body 351, and two ends of the rotating shaft are rotatably installed to the base through holes 326c, 326d of the two rotating shaft bases 326a, 326b to allow the rotating shaft 333 to rotate relative to the rotating shaft bases 326a, 326b.

In the height adjustment apparatus 350, the first bracket 352 includes two first links 3521a, 3521b disposed in parallel, and a first cross beam 3522. Two ends of the first cross beam 3522 are connected to the first link 3521a, 3521b, respectively. An outer side of an upper end of the first link 3521a or 3521b is disposed with a first pulley 3523a or 3523b, and the two first pulleys 3523a, 3523b are slidably mounted in the second sliding grooves 357a and 357b, respectively. The second bracket 353 includes two second links 3531a, 3531b disposed in parallel, and a second cross beam 3532. Two ends of the second cross beam 3532 are connected to the second links 3531a, 3531b, respectively. An outer side of a lower end of the second link 3531a or 3531b is disposed with a second pulley 3533a or 3533b, and the two second pulleys 3533a, 3533b are slidably mounted in the third sliding grooves 358a, 358b, respectively.

The height adjustment apparatus 350 further includes a third telescopic rod 359, an end of which is rotatably connected to the first bracket 352 or the second bracket 353, and another end of which is rotatably connected to the vehicle 310. Preferably, a third cross beam (not shown in the figure) is disposed on the first bracket 352, and two ends of the third cross beam are perpendicularly connected to the two first link 3521a, 3521b, respectively. A sleeve 3524 is sheathed outside the third cross beam. An upper end of the third telescopic rod 359 is hinged to the sleeve 3524 and can rotate around the third cross beam.

The third telescopic rod 359 is a hydraulic telescopic rod or an electric telescopic rod. The third telescopic rod 359 is equipped with a second telescopic rod controller 335. When receiving a command electrical signal, the third telescopic rod controller 360 can control the second telescopic rod 332 to adjust a length of the second telescopic rod.

The third telescopic rod 359 is a hydraulic telescopic rod or an electric telescopic rod, which is connected to a processor 340 (refer to FIG. 18), and the processor 340 is configured to send electrical signals to control the first telescopic rod 328, the second telescopic rod 332, and the third telescopic rod to adjust their length, respectively.

As shown in FIG. 3, when the docking robot 300 travels to a vicinity of the cleaning area 500 (solar panel or panel array), the data processing system 400 controls the docking robot 300 to adjust positions and directions of the docking robot 300, so that the docking robot 300 travels to the first docking area 505 at a lower part of a right end of the cleaning area 500, and to make the entrance 323 of the docking apparatus 320 right toward a direction of the cleaning area 500.

In the present embodiment, when the docking robot 300 is traveling in the passage area 103, the lengths of the second telescopic rod 332 and the third telescopic rod 359 are minimized, a height of the height adjustment apparatus 350 is minimized, the docking platform 321 is disposed horizontally on the top of the vehicle 310, and an included angle between the docking platform 321 and the upper surface of the vehicle 310 is zero degree. If the cleaning robot 200 is parked on the docking platform 321, the cleaning robot 200 can remain stable during transportation and will not slip off.

As shown in FIG. 3, when the docking robot 300 travels to the first docking area 505 of the cleaning area 500, the processor 340 sends electrical signals to the second telescopic rod controller 335 and/or the third telescopic rod controller 360 to control the second telescopic rod 332 and/or the third telescopic rod 359 to extend. The third telescopic rod 359 is extended, so that the frame body 351 at the upper end of the height adjustment apparatus 350 and the docking platform 321 are raised. The second telescopic rod 332 is extended, so that an end of the docking platform 321 away from the rotating shaft 333 is propped up, and another end of the docking platform rotates around the rotating shaft 333, so that the included angle between the docking platform 321 and the upper surface of the vehicle 310 gradually increases until it is consistent with a tilt angle of the cleaning area 500 (solar panel or panel array) relative to the horizontal plane, so that the upper surface of the docking platform 321 and the upper surface of the panel in the cleaning area 500 are on a same plane.

Similarly, after a docking process is completed, the processor 340 sends electrical signals to the second telescopic rod controller 335 and/or the third telescopic rod controller 360 to control the second telescopic rod 332 and/or the third telescopic rod 359 to be shortened. The second telescopic rod 332 is shortened, so that the included angle between the docking platform 321 of the docking apparatus 320 and the horizontal plane is reduced to zero degree, and the docking platform 321 is restored from an inclined state to a horizontal state. The third telescopic rod 359 is shortened, so that the frame body 351 at the upper end of the height adjustment apparatus 350 and the docking platform 321 are lowered to the lowest point, and the docking robot 300 can then travel to other positions.

During an extension or contraction of the second telescopic rod 332, the two ends of the rotating shaft 333 rotate in the two base through holes 326c, 326d, and the two ends of the sliding shaft 331 slide in the two first sliding grooves 325c, 325d, so that a bottom of the docking platform 321 can keep stable during a tilt angle adjustment process without shaking.

During an extension or contraction of the third telescopic rod 359, the lower end of the first bracket 352 rotates relative to the vehicle, and the first pulleys 3523a, 3523b on the left and right sides of the upper end of the first bracket are slid in the second sliding grooves 357a, 357b, respectively. The upper end of the second bracket 353 rotates relative to the docking apparatus 320, and the second pulleys 3533a, 3533b on the left and right sides of the lower end of the second bracket are slid in the third sliding grooves 358a, 358b, respectively. Shape and size of the first bracket 352 and the second bracket 353 are approximately same. The first link 3521b and the second link 3531b have same length. A rotation angle of the lower end of the first bracket 352 is same as a rotation angle of the upper end of the second bracket 353. A sliding distance of the upper end of the first bracket 352 is same as a sliding distance of the lower end of the second bracket 353. During a lifting process of the height adjustment apparatus 350, the docking apparatus 320 is always stable and will not shake. If the cleaning robot 200 is loaded on the docking platform 321, it can be ensured that the cleaning robot 200 will not slip off the docking apparatus 320.

If the tilt angles of all the solar panels in the work area 100 are the same and remain unchanged, an extension distance of the second telescopic rod 332 can be a preset constant length. When each time the second telescopic rod 332 is extended, an adjusted tilt angle of the docking platform 321 is same as a tilt angle of the panel.

If all the solar panels in the work area 100 have a same height, an extension distance of the third telescopic rod 359 can also be a preset constant length. The extension distance of the third telescopic rod 359 can be the preset constant length. Each time the third telescopic rod 359 is extended, a rising height of the docking platform 321 is same, which is greater than or equal to a height of the lower end of the panel.

If the tilt angles and/or heights of all the solar panels in the work area 100 are different, the data processing system 400 issues commands to the processor 340 of the docking robot 300 according to a panel height and a panel tilt angle of the cleaning area 500. The processor 340 issues commands to the third telescopic rod controller 360 to adjust a height of the height adjustment apparatus 350 and a height of the docking platform 321. The processor 340 issues commands to the second telescopic rod controller 335 to adjust the tilt angle of the docking platform 321.

When the tilt angle of the docking platform 321 is adjusted, the data processing system 400 receives feedback information from the docking robot 300 and sends an action command to the cleaning robot 200 to control the cleaning robot 200 to travel from the docking platform 321 in the first docking area 505 to the solar panel (referred to as on-board process) in the second docking area 506, or to travel from the solar panel in the second docking area 506 to the docking platform 321 (referred to as off-board process) in the first docking area 505, so as to complete the docking process.

As shown in FIG. 12, the docking robot 300 of the present embodiment further includes a circuit board 314, which is preferably disposed in the vehicle 310. The processor 340 is disposed on the circuit board 314 as a control device configured to connect to the docking robot 300. The processor 340 is connected to the first telescopic rod controller 329, the second telescopic rod controller 335, and the third telescopic rod controller 360, respectively, and is configured to issue control commands to the first telescopic rod controller 329 and/or the second telescopic rod controller 335, and/or the third telescopic rod controller 360.

Figure 13:
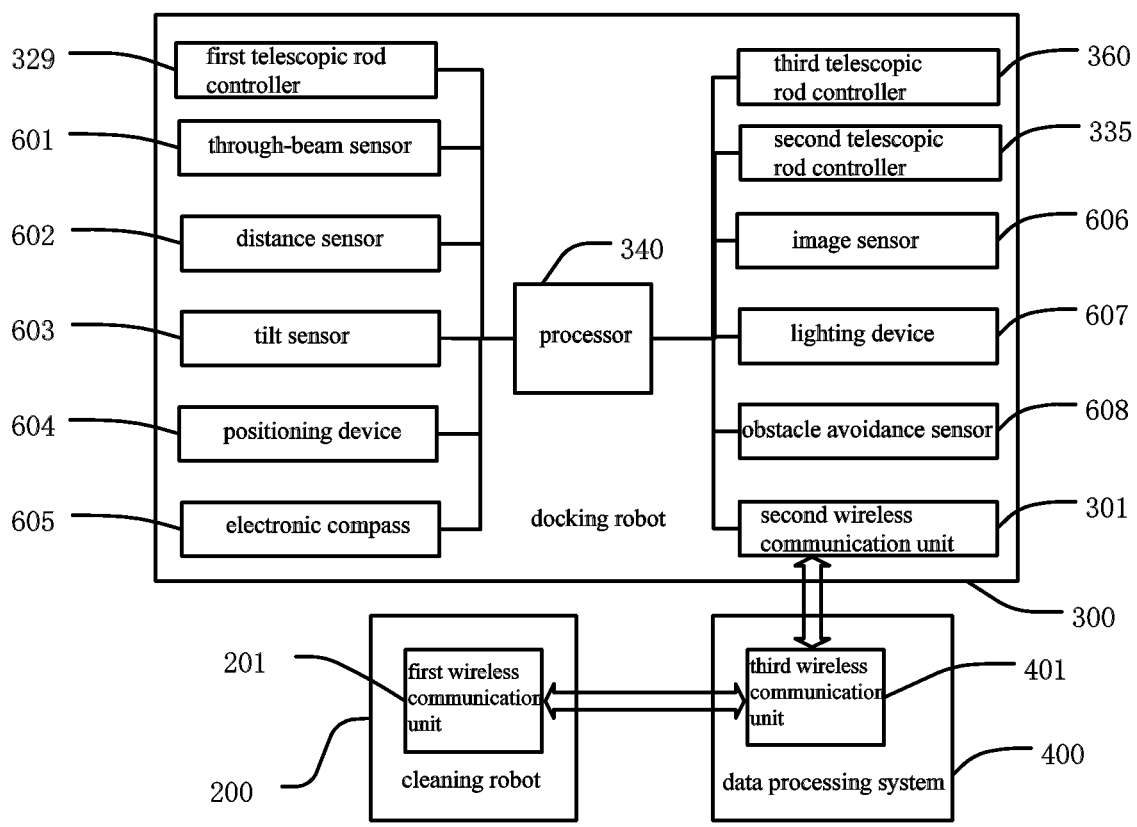
FIG. 13 is a functional block diagram of electronic devices of the cleaning system of an embodiment of the present invention.

As shown in FIG. 13, the cleaning robot 200 is provided with a first wireless communication unit 201. The docking robot 300 is provided with a second wireless communication unit 301, and the data processing system 400 is provided with a third wireless communication unit 401. The first wireless communication unit 201 and the second wireless communication unit 301 are wirelessly connected to the third wireless communication unit 401, respectively, so that the cleaning robot 200 or the docking robot 300 can exchange data in a wireless communication manner with the data processing system 400.

As shown in FIG. 4, when the docking robot 300 travels to the vicinity of the cleaning area 500 (solar panel or panel array), the data processing system 400 controls the docking robot 300 to adjust positions and directions of the docking robot 300, so that the docking robot 300 travels to the first docking area 505 at the lower part of the right end of the cleaning area, with the entrance 323 of the docking apparatus 320 positioned right toward the direction of the cleaning area 500.

As shown in FIGS. 5 and 6 and FIGS. 10 to 12, in the present embodiment, when the docking robot 300 is traveling in the passage area 103, a length of the second telescopic rod 332 is minimized, the docking platform 321 is disposed horizontally on the top of the vehicle 310, and the included angle between the docking platform 321 and the upper surface of the vehicle 310 is zero degree. If the cleaning robot 200 is parked on the docking platform 321, the cleaning robot 200 can remain stable during transportation and will not slip off.

As shown in FIGS. 4 to 6, when the docking robot 300 travels to the first docking area 505 of the cleaning area 500, the processor 340 sends an electrical signal to the second telescopic rod controller 335 to control the second telescopic rod 332 to extend, an end of the docking platform 321 away from the rotating shaft 333 is propped up, and another end of the docking platform rotates around the rotating shaft 333, so that an included angle between the docking platform 321 and the upper surface of the vehicle 310 gradually increases until it is consistent with a tilt angle of the cleaning area 500 (solar panel or panel array) relative to the horizontal plane, so that the upper surface of the docking platform 321 and the upper surface of the panel in the cleaning area 500 are on a same plane. As shown in FIGS. 7 to 9, during an extension of the second telescopic rod 332, the two ends of the rotating shaft 333 rotate in the two base through holes 326c, 326d, and the two ends of the sliding shaft 331 slide in the two first sliding grooves 325c, 325d, so that a bottom of the docking platform 321 can keep stable during a tilt angle adjustment process without shaking.

If the tilt angles of all solar panels in the work area 100 are the same and remain unchanged, an extension distance of the second telescopic rod 332 can be a preset constant length. When each time the second telescopic rod 332 is extended, an adjusted tilt angle of the docking platform 321 is same as a tilt angle of the panel.

If the tilt angles of all solar panels in the work area 100 are different, the data processing system 400 issues commands to the processor 340 of the docking robot 300 according to a panel tilt angle of the cleaning area 500. The processor 340 issues commands to the second telescopic rod controller 335 to adjust the tilt angle of the docking platform 321.

When the tilt angle of the docking platform 321 is adjusted, the data processing system 400 receives feedback information from the docking robot 300 and sends an action command to the cleaning robot 200 to control the cleaning robot 200 to travel from the docking platform 321 in the first docking area 505 to the solar panel (referred to as on-board process) in the second docking area 506, or to travel from the solar panel in the second docking area 506 to the docking platform 321 (referred to as off-board process) in the first docking area 505, so as to complete the docking process.

In the present embodiment, when the docking platform 321 is in the inclined state, a height of a lowest point of the docking platform 321 is greater than or equal to a lowest end of the solar panel or panel array in the work area 100 (such as the lower end 502 of the cleaning area). A height of a highest point of the docking platform 321 is less than or equal to a highest end of the solar panel or panel array in the work area 100 (such as the upper end 501 of the cleaning area), thereby ensuring that the docking platform 321 can be connected to a left side or a right side of the solar panel or panel array (such as the left end 503 or the right end 504 of the cleaning area) to enable an all-round docking during the docking process.

Regardless of whether the docking platform 321 is in the inclined state or a flat state, the height of the lowest point of the docking platform 321 is substantially unchanged, and the height basically depends on a height of the top of the vehicle 310. Preferably, a docking position between the docking platform 321 and the panel is positioned at a lower part of the right side of the panel or panel array, wherein a height requirement for the vehicle 310 is relatively low. The lower a center of gravity of the vehicle 310 is, the more stable the docking robot 300 will be during a traveling process of carrying the cleaning robot, effectively preventing from bumps and shaking caused by uneven road surfaces.

As shown in FIG. 13, in the present embodiment, the docking robot 300 is further provided with various data collection devices configured to collect various work data during a working process of the docking robot 300. The data collection devices include different types of sensors, including a through-beam sensor 601, a distance sensor 602, a tilt sensor 603, a positioning device 604, an electronic compass 605, an image sensor 606, a lighting device 607, and an obstacle avoidance sensor 608, and so on. Each of the above-mentioned sensors is wired or wirelessly connected to the processor 340. Original work data collected during an operation of the docking robot 300 is sent to the processor 340, and processed by the processor 340 to generate preprocessed data. The original work data and/or the preprocessed data is sent to the data processing system 400 through the wireless communication unit to realize real-time monitoring of the docking robot 300 operation process and real-time control of the traveling process and/or the docking process of the docking robot 300.

As shown in FIGS. 5 to 7, the through-beam sensor 601 includes a transmitter 601a and a receiver 601b disposed oppositely on the inner sidewalls of the left baffle 322a and the right baffle 322c of the docking apparatus 320, respectively. The transmitter 601a and the receiver 601b are close to the entrance 323, and are disposed on two sides of the entrance 323, respectively. The through-beam sensor 601 is preferably a pair of through-beam infrared sensors. Infrared rays emitted by the transmitter 601a are captured by the receiver 601b. When the infrared rays are shielded, the processor 340 can determine that an item passes through the entrance 323.

When the cleaning robot 200 travels from an outside to the entrance of the docking apparatus 320, the infrared rays between the transmitter 601a and the receiver 601b are shielded, and the through-beam sensor 601 can sense that a front end of the cleaning robot 200 is traveling to the docking apparatus 320. When all parts of the cleaning robot 200 are completely inside the docking apparatus 320, the infrared rays between the transmitter 601a and the receiver 601b return to an unobstructed state, and the through-beam sensor 601 can sense that a back end of the cleaning robot 200 is also traveled to the docking apparatus 320. Based on the real-time electrical signal of the through-beam sensor 601, the processor 340 can determine that the front end of the cleaning robot 200 is traveling to the docking apparatus 320, or that the whole of the cleaning robot 200 is traveling completely into the docking apparatus 320.

The distance sensor 602 is disposed on an inner sidewall of a middle of the rear baffle 322b of the docking apparatus 320, and is disposed opposite to the entrance 323. The distance sensor 602 is preferably a reflective infrared sensor. The reflective infrared sensor continuously emits infrared rays toward the entrance 323. If a reflected infrared rays can be received, it can be determined that the cleaning robot 200 enters the docking platform 321 from the entrance 323. Furthermore, a distance between the front end of the cleaning robot 200 and the rear baffle 322b of the docking apparatus 320 can be acquired according to a time of an infrared ray being received.

When the cleaning robot 200 travels from the outside to the entrance of the docking apparatus 320, the distance sensor 602 (reflective infrared sensor) can determine that the cleaning robot 200 is traveling to the docking apparatus 320 or not. At the same time, the distance between the front end of the cleaning robot 200 and the rear baffle 322b can be acquired according to a time of the infrared ray being received. The processor 340 acquires a value of the distance, and can monitor a progress of the cleaning robot 200 entering the docking apparatus 320 in real time, thereby determining whether the whole of the cleaning robot 200 is traveling inside the docking platform 321 or not.

When the cleaning robot 200 travels out of the docking apparatus 320 through the entrance, the distance sensor 602 (reflective infrared sensor) can determine that the cleaning robot 200 is traveling in and out of the docking apparatus 320. At the same time, the distance between the front end of the cleaning robot 200 and the rear baffle 322b can be acquired according to a time of the infrared ray being received. The processor 340 acquires the value of the distance, and can monitor a progress of the cleaning robot 200 leaving the docking apparatus 320 in real time, thereby determining whether the whole of the cleaning robot 200 is traveling outside the docking platform 321 or not.

The tilt sensor 603 is preferably disposed on the lower surface of the docking platform 321 (refer to FIG. 8) to measure the included angle between the upper surface of the docking platform 321 and the horizontal plane (referred to as a platform tilt angle) in real time, and is configured to send a value of the platform tilt angle to the processor 340. If the tilt angles of all solar panels in the work area 100 are different or the tilt angles of some panels are variable, each time the second telescopic rod 332 is extended, the tilt sensor 603 monitors the value of the platform tilt angle in real time and sends the value of the platform tilt angle to the processor 340. When the value of the platform tilt angle in real time is same as the tilt angle of the panel, the processor 340 sends a stop command to the second telescopic rod controller 335, so that the second telescopic rod 332 stops extending, therefore the platform tilt angle is same as the tilt angle of the panel.

In the present embodiment, the positioning device 604 is a radio frequency identification (RFID) reader, which is disposed inside or outside the vehicle 310, preferably at the bottom of the vehicle 310 or the front end of the docking platform 321, and is configured to obtain real-time positions in the work area and to send the real-time positions of the vehicle 310 to the processor 340.

In the present embodiment, a label positioning solution is adopted. A recommended route is preset in the passage area 103. The vehicle 310 is controlled to travel along the recommended route, and a set of identifiable tags are disposed at regular intervals on the recommended route, such as RFID tags. Each of the identifiable tag stores location coordinates of the identifiable tag in the work area and other data. When the docking robot 300 travels to a certain positioning point, the RFID reader reads the preset RFID tag at the positioning point, the processor 340 acquires the real-time position of the docking robot 300, and optionally sends it to the data processing system 400. In other embodiments, the positioning device 604 can also be a high-precision global positioning system (GPS) positioning unit or a BEIDOU positioning unit, and can also obtain the real-time position of the docking robot 300.

The electronic compass 605 is preferably disposed inside or outside the vehicle 310 to obtain a real-time travel direction of the shuttling robot 300 and send the real-time travel direction to the processor 340 for data processing and data analysis to determine whether the real-time travel direction of the docking robot 300 is consistent with a preset direction or not. If the docking robot 300 deviates from the preset direction, the processor 340 sends a command to the vehicle 310 to adjust the travel direction of the vehicle 310 in time.

Preferably, the image sensor 606 and/or the lighting device 607 are disposed at a front and/or rear of the vehicle 310, and the image sensor 606 is configured to collect real-time images and/or pictures of the front and/or rear of the vehicle 310 in real time, and send them to the processor 340. When the docking robot 300 travels in the passage area 103 of the work area 100, an image content collected by the image sensor 606 includes an accessible area in the passage area 103 at any time and is sent to the processor 340. The processor 340 calculates an expected travel area covered by the vehicle 310 in a next period according to a real-time travel speed of the vehicle 310, and compares the expected travel area and an accessible area at each moment in real time to determine whether the vehicle 310 is still in the accessible area in the next period or not. If the expected travel area exceeds the accessible area, it proves that there is an obstacle on a travel route of the vehicle 310. The processor 340 needs to adjust the travel direction of the vehicle 310 in real time to prevent the vehicle 310 from hitting the obstacle during travel.

In another embodiment, the image content collected by the image sensor 606 can further include a border of the solar panel and/or the panel array, and the border is displayed as a border line in the image. In another embodiment, after processing by a specific algorithm, the docking robot 300 is adjustable in the travel direction in real time with reference to a position of the border line, so that the docking robot 300 can travel in a straight line as much as possible.

When the docking robot 300 is traveling in a dark environment (such as night, cloudy, etc.), the lighting device 607 is configured to illuminate the passage area in front and/or behind the vehicle 310 for the image sensor 606 to collect the images and/or pictures normally. In some other embodiments, the image sensor 606 and/or the lighting device 607 can also be disposed on the left and/or right side of the vehicle 310 for real-time collection of real-time images and/or pictures on the left and/or right side of the vehicle 310. In some other embodiments, the image sensor 606 and/or the lighting device 607 can also be disposed on the side of the docking apparatus 320, and a camera provided by the image sensor 606 is disposed towards the outside. When the height and the tilt angle of the docking platform 321 are adjusted to be consistent with the solar panel 102, the camera is right facing the solar panel 102.

The obstacle avoidance sensor 608, preferably an ultrasonic sensor, is disposed at the front and/or rear of the vehicle 310. During the traveling process of the docking robot 300, when the processor 340 acquires a sensing signal send from the obstacle avoidance sensor 608 at the front or rear, it can determine that there is an obstacle in the front or rear of the vehicle in a travel route that affect the driving, so that the processor 340 can adjust the travel direction of the docking robot 300 to avoid the obstacle. In other embodiments, the obstacle avoidance sensor 608 can also be disposed on the left and/or right side of the vehicle 310.

The present invention provides a docking robot, which is used as a carrier of the cleaning robot to transfer the cleaning robot in the channel area between a plurality of solar panel arrays, so that the cleaning robot can complete cleaning work on different solar panel arrays. In this embodiment, both the height and the tilt angle of the docking platform of the docking robot can be adjusted. Even if the height of the solar panel is relatively large, the docking platform and the solar panel can be fully mated.

Figure 14:
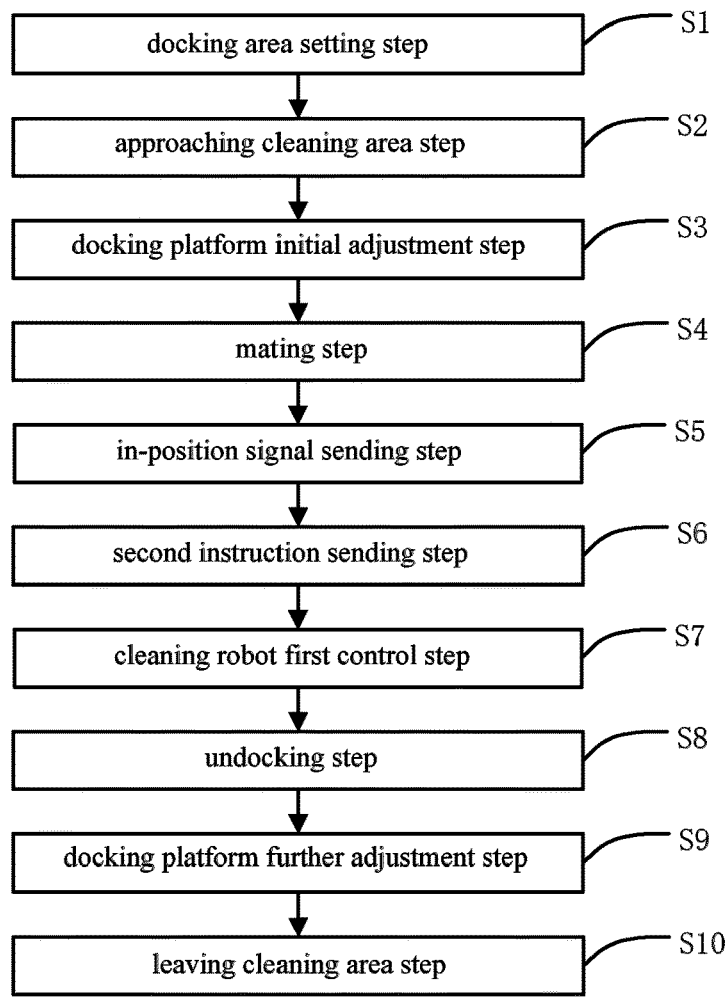
FIG. 14 is a flowchart of a docking method of an embodiment of the present invention.

As shown in FIG. 14, based on the above embodiments, the present invention further provides a docking method, which includes the following steps S1 to S10 performed sequentially.

A docking area setting step S1: setting a first docking area located outside each of a plurality of cleaning areas (solar panels or panel arrays) and adjoining a side of the cleaning area, and setting a second docking area located in the cleaning area, adjoining the side of the cleaning area, and corresponding to the first docking area.

An approaching cleaning area step S2: dispatching a docking robot to the first docking area of the cleaning area through a data processing system.

Figure 15:
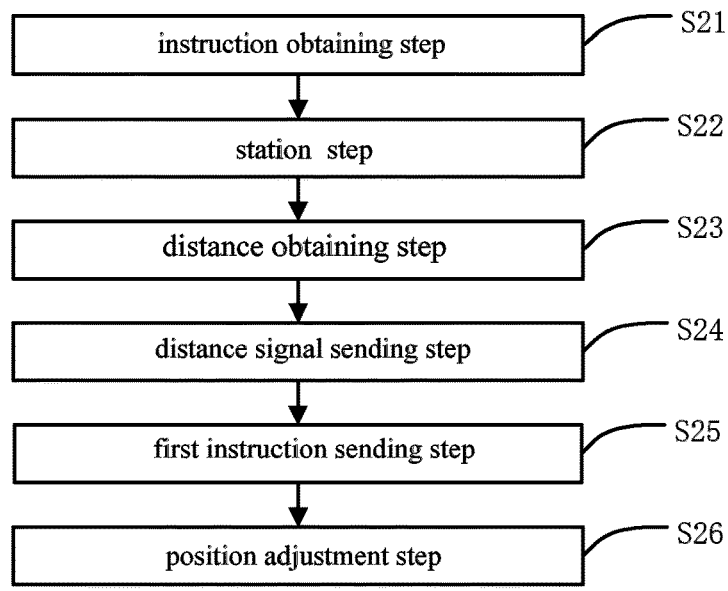
FIG. 15 is a flowchart of an approaching cleaning area step in accordance with an embodiment of the present invention.

As shown in FIG. 15, the approaching cleaning area step S2 includes: an instruction obtaining step S21: obtaining a travel control instruction issued by the data processing system, wherein the travel control instruction includes a destination position and a recommended route of a transfer path of the docking robot; a station step S22: controlling the docking robot to travel along the recommended route to the destination position located in the first docking area according to the travel control instruction, wherein the destination position is in the first docking area; a distance obtaining step S23: obtaining a current distance S between the docking robot and a border of the cleaning area, and determining whether the current distance S is greater than a predetermined distance threshold S0; a distance signal sending step S24: sending a signal of the current distance S to the data processing system by the docking robot; a first instruction sending step S25: sending a first travel instruction to the cleaning robot by the data processing system; a position adjustment step S26: controlling the docking robot to turn right at a steering angle A and travel forward at an advance distance B, and then turn left at the steering angle A and travel back at a rearward distance C to travel to the first docking area based on the current distance S greater than the predetermined distance threshold S0, wherein the advance distance B is determined by an equation set forth as $(S-S0)/\sin A$, and the rearward distance C is determined by an equation set forth as $(S-S0)/tgA$; and controlling the docking robot to turn left at the steering angle A and travel forward at the advance distance B, and then turn right at the steering angle A and travel back at the rearward distance C to travel to the first docking area based on the current distance S less than the predetermined distance threshold S0, wherein the advance distance B is determined by an equation set forth as $(S0-S)/\sin A$, and the rearward distance C is determined by an equation set forth as $(S0-S)/tgA$.

A docking platform initial adjustment step S3: adjusting an angle and/or a height of a docking platform assembled to the docking robot. In this embodiment, the docking robot is equipped with the angle adjustment device 330 and the height adjustment device 350, and the height and angle of the docking platform can be adjusted. After adjustment, an upper surface of the docking platform of the docking robot is flush with an upper surface of a panel located in the cleaning area, so that the cleaning robot can travel on a same plane, wherein an entrance of a docking apparatus faces the second docking area, so that the cleaning robot can travel freely.

A mating step S4: mating, by the docking robot, the docking platform to the second docking area of the cleaning area. In the mating step, a bridge board provided by the docking robot extends from the docking robot to connect the upper surface of the docking platform to the upper surface of the panel in the cleaning area. For the case where a distance between the docking platform and the solar panel is relatively close, such as less than 10 centimeters (cm), the cleaning robot with tracks can walk directly between the docking platform and the solar panel without using the bridge board, so the mating step S4 may be omitted.

An in-position signal sending step S5: sending, by the docking robot, an in-position signal indicating the docking robot arrives in position to the data processing system to inform the data processing system that the docking robot has traveled to the first docking area.

A second instruction sending step S6: after the docking robot has traveled to the first docking area, the data processing system issues a second travel instruction to the cleaning robot according to actual situations, which generally include two situations, one is to transfer the cleaning robot loaded on the docking robot to the panel in the cleaning area, and the other is to transfer the cleaning robot from the panel in the cleaning area to the docking platform of the docking robot.

A cleaning robot first control step S7: the data processing system issues instructions to the cleaning robot according to the actual situation, and controls the cleaning robot to pass through the entrance from the first docking area to the second docking area, so that the cleaning robot loaded on the docking robot is transferred to the panel in the cleaning area; alternatively, the data processing system controls the cleaning robot to pass through the entrance from the second docking area to the first docking area, so that the cleaning robot is transferred from the panel in the cleaning area to the docking platform of the docking robot. The docking apparatus of the docking robot is equipped with a through-beam sensor and a distance sensor, which can determine in real time whether the cleaning robot in the docking apparatus has completely left the docking platform, or determine in real time whether the cleaning robot on the panel has travelled to completely enter the docking platform, thereby to determine whether the cleaning robot has completed the transfer.

An undocking step S8: after the cleaning robot has been transferred, the docking robot separates the docking platform from the second docking area of the cleaning area. In the undocking step, the docking robot retracts the bridge board so that the upper surface of the docking platform of the docking apparatus is separated from the upper surface of the panel in the cleaning area. For the case where a distance between the docking platform and the solar panel is relatively close, such as less than 10 cm, because the cleaning robot has the tracks at the bottom, the cleaning robot can pass through a road with a small width. Therefore, the docking step S4 and the undocking step S8 can be omitted.

A docking platform further adjustment step S9: the docking robot adjusts the angle and/or the height of the docking platform to make the upper surface of the docking platform be in a horizontal state. In this embodiment, the docking robot is equipped with the angle adjusting device 330 and the height adjusting device 350, and the height and angle of the docking platform of the docking robot can be adjusted. After adjustment, the upper surface of the docking platform of the docking apparatus of the docking robot is adjusted to the horizontal state, so that the cleaning robot can be kept in the horizontal state. When the docking robot carries the cleaning robot to other panels, the cleaning robot can maintain a stable horizontal state on the docking platform.

A leaving cleaning area step S10: controlling the docking robot to leave the first docking area.

In a process of employing a docking robot to transfer a cleaning robot from the first cleaning area to the second cleaning area, an unloaded docking robot is called to the first cleaning area, and steps S1 to S10 are performed. In step S6, the data processing system issues the second travel instruction to the cleaning robot in the first cleaning area. In step S7, control the cleaning robot to travel from the second docking area to the docking platform of the unloaded docking robot in the first docking area.

Figure 16:
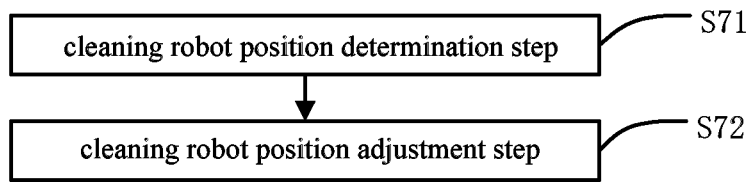
FIG. 16 is a flowchart of a cleaning robot control step in accordance with an embodiment of the present invention.

As shown in FIG. 16, when the cleaning robot needs to travel from the second docking area to the first docking area, the cleaning robot is in a process of traveling to the docking robot. If a parking position or a head of the cleaning robot deviates, the cleaning robot will run a certain risk of falling. Therefore, the cleaning robot first control step S7 further includes the following steps S71~S72. A cleaning robot position determination step S71: determining whether the cleaning robot is in the second docking robot; if not, go to step S72. A cleaning robot position adjustment step S72: adjusting a position of the cleaning robot to be positioned in the second docking area.

Figure 17:
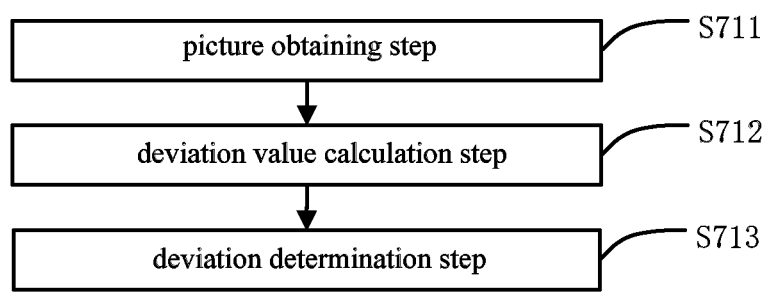
FIG. 17 is a flowchart of a cleaning robot position determination step in accordance with an embodiment of the present invention.

As shown in FIG. 17, the cleaning robot position determination step S71 includes a picture obtaining step S711: obtaining a real-time picture including a graphic identifier provided on the cleaning robot; a deviation value calculation step S712: calculating a deviation value D between a position of the graphic identifier in the real-time picture and a preset position of the graphic identifier; and a deviation determination step S713: determining that the cleaning robot has reached the second docking area based on an absolute value of the deviation value D being less than a predetermined threshold DO, and determining that the cleaning robot deviates from the second docking area based on an absolute value of the deviation value D being greater than or equal to the predetermined threshold DO. The graphic identifier is disposed on an outer surface of a housing of the cleaning robot in advance. The graphic features, shape, color, and size of the graphic are all stored in advance in the docking robot and/or the data processing system. Similarly, the deviation value D of the preset position of the graphic identifier in the real-time picture is also stored in advance in the docking robot and/or the data processing system.

Figure 18:
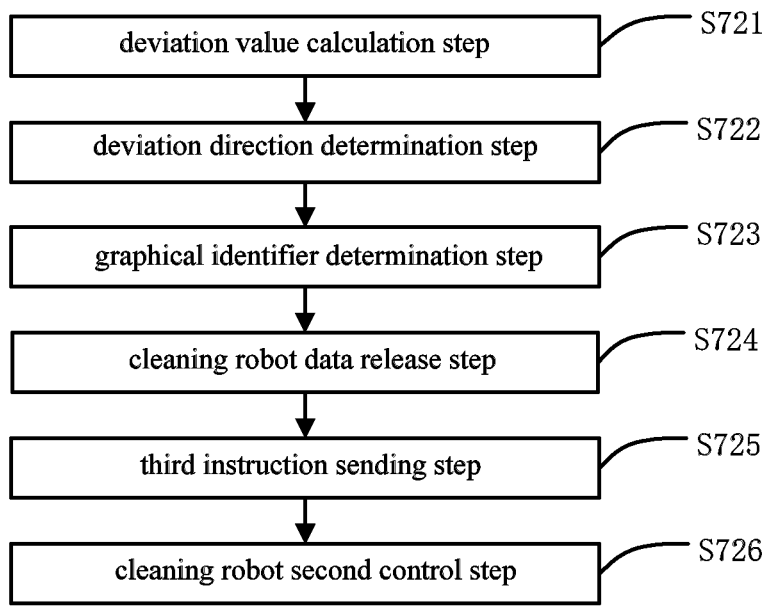
FIG. 18 is a flowchart of a cleaning robot position adjustment step in accordance with an embodiment of the present invention The reference numbers in the figures are given in the disclosure below.

As shown in FIG. 18, the cleaning robot position adjustment step S72 includes: a deviation value calculation step S721: calculating a deviation value D between a position of the graphic identifier in the real-time picture and a preset position of the graphic identifier; a deviation direction determination step S722: determining a deviation direction of the cleaning robot according to the deviation value D; a graphical identifier determination step S723: determining whether the graphic identifier is located on a front surface or a rear surface of the cleaning robot; a cleaning robot data release step S724: sending the deviation direction of the cleaning robot and a location of the graphic identifier on the cleaning robot to a data processing system; a third instruction sending step S725: sending a third travel instruction to the cleaning robot through the data processing system; a cleaning robot second control step S726 of controlling the cleaning robot to turn right at a steering angle F and travel back at a first distance G, and then turn left at the steering angle F and travel forward at a second distance H to travel to the second docking area based on the cleaning robot deviating to the left and the graphic identifier located on the front surface of the cleaning robot; controlling the cleaning robot to turn right at the steering angle F and travel forward at the first distance G, and then turn left at the steering angle F and travel back at the second distance H to travel to the second docking area based on the cleaning robot deviating to the left and the graphic identifier located on the rear surface of the cleaning robot; controlling the cleaning robot to turn left at the steering angle F and travel back at the first distance G, and then turn right at the steering angle F and travel forward at the second distance H to travel to the second docking area based on the cleaning robot deviating to the right and the graphic identifier located on the front surface of the cleaning robot; and controlling the cleaning robot to turn left at the steering angle F and travel forward at the first distance G, and then turn right at the steering angle F and travel back at the second distance H to travel to the second docking area based on the cleaning robot deviating to the right and the graphic identifier located on the rear surface of the cleaning robot. The first distance G is determined by an equation set forth as $E/\sin F$, and the second distance H is determined by an equation set forth as $E/\tg F$.

Steps S71~S72 are preformed to confirm the position of the cleaning robot before travelling to the docking platform. Once it is found that the position where the cleaning robot is parked in the cleaning area cannot completely correspond to the position of the docking platform, there is a risk of falling when the cleaning robot travels to the docking platform. In order to ensure safety, the docking robot needs to determine whether a parking position of the cleaning robot in the cleaning area corresponds exactly to a position of the docking platform. Only when there is a complete correspondence, the docking robot sends a confirmation instruction to inform the data processing system, thereby controlling the cleaning robot to travel from the second docking area to the first docking area. If the parking position of the cleaning robot in the cleaning area does not completely correspond to the position of the docking platform, the docking robot will inform the data processing system to adjust a position of the cleaning robot, so that the cleaning robot is parked in the cleaning area in position to correspond exactly to the position of the docking platform.

When the docking robot loaded with the cleaning robot is called to the second cleaning area, the above steps S2 to S10 are executed. In step S5, the docking robot travels to the first docking area of the second cleaning area. In step S6, the data processing system issues the second travel instruction to the cleaning robot carried by the docking robot. In step S6, the cleaning robot is controlled to travel from the docking platform of the docking robot in the first docking area to the second docking area in the second cleaning area. When the cleaning robot needs to travel from the first docking area to the second docking area, the cleaning robot may travel directly according to the second travel instruction.

The present invention provides a docking method using a cleaning robot to complete cleaning on a solar panel or a solar panel array, and using a docking robot to transfer the cleaning robot between multiple solar panel arrays, thereby to complete a cleaning operation on a large number of solar panels and panel arrays in a photovoltaic power station in a shortest time.

The above-described disclosure is only the preferred embodiments of the present invention. It should be noted that for those of ordinary skill in the art, without departing from the principle of the present invention, several improvements and modifications can be made, and these improvements and modifications should also be regarded as the protection scope of the present invention.

What is claimed is:
1. A docking method, comprising:
   a docking area setting step of setting a first docking area located outside each of a plurality of cleaning areas and adjoining a side of the cleaning area, and setting a second docking area located in the cleaning area, adjoining the side of the cleaning area, and corresponding to the first docking area;
   an approaching cleaning area step of dispatching a docking robot to the first docking area adjoining the cleaning area;
   a docking platform initial adjustment step of adjusting an angle and/or a height of a docking platform to allow an upper surface of the docking platform to be flush with an upper surface of a panel located in the cleaning area, and allow an entrance of a docking apparatus to face the second docking area;
   a cleaning robot first control step of controlling a cleaning robot to pass through the entrance from the first docking area to the second docking area, or from the second docking area to the first docking area;
   a docking platform further adjustment step of adjusting the angle and/or the height of the docking platform to make the upper surface of the docking platform be in a horizontal state; and
   a leaving cleaning area step of controlling the docking robot to leave the first docking area;
   wherein the approaching cleaning area step comprises:

an instruction obtaining step of obtaining a travel control instruction including a destination position and a recommended route of a transfer path of the docking robot;

a station step of controlling the docking robot to travel along the recommended route to the destination position in the first docking area;

a distance obtaining step of obtaining a current distance between the docking robot and a border of the cleaning area, and determining whether the current distance is greater than a predetermined distance threshold; and a position adjustment step of controlling the docking robot to turn right at a steering angle and travel forward at an advance distance, and then turn left at the steering angle and travel back at a rearward distance to travel to the first docking area based on the current distance greater than the predetermined distance threshold, wherein the advance distance is determined by an equation set forth as (S−S0)/sin A, and the rearward distance is determined by an equation set forth as (S−S0)/tgA, in which S represents the current distance, S0 represents the predetermined distance threshold, and A represents the steering angle, and controlling the docking robot to turn left at the steering angle and travel forward at the advance distance, and then turn right at the steering angle and travel back at the rearward distance to travel to the first docking area based on the current distance less than the predetermined distance threshold, wherein the advance distance is determined by an equation set forth as (S0−S)/sin A, and the rearward distance is determined by an equation set forth as (S0−S)/tgA.

2. The docking method of claim 1, wherein, prior to the position adjustment step, the approaching cleaning area step further comprises a distance signal sending step of sending a signal of the current distance to a data processing system, and a first instruction sending step of sending a first travel instruction to the cleaning robot.

3. The docking method of claim 1, wherein, prior to the cleaning robot first control step, based on the cleaning robot needing to travel from the second docking area to the first docking area, the docking method further comprises a cleaning robot position determination step, which determines whether the cleaning robot is in the second docking area, and a cleaning robot position adjustment step, which, in response to detecting that the cleaning robot is not in the second docking area, adjusts a position of the cleaning robot to be positioned in the second docking area.

4. The docking method of claim 3, wherein the cleaning robot position determination step comprises:

a picture obtaining step of obtaining a real-time picture including a graphic identifier provided on the cleaning robot;

a deviation value calculation step of calculating a deviation value between a position of the graphic identifier in the real-time picture and a preset position of the graphic identifier; and a deviation determination step of determining that the cleaning robot has reached the second docking area based on an absolute value of the deviation value being less than a predetermined threshold, and determining that the cleaning robot deviates from the second docking area based on an absolute value of the deviation value being greater than or equal to the predetermined threshold.

5. The docking method of claim 4, wherein the cleaning robot position adjustment step comprises:

a deviation direction determination step of determining a deviation direction of the cleaning robot according to the deviation value;

a graphical identifier determination step of determining whether the graphic identifier is located on a front surface or a rear surface of the cleaning robot; and a cleaning robot second control step of controlling the cleaning robot to turn right at a steering angle and travel back at a first distance, and then turn left at the steering angle and travel forward at a second distance to travel to the second docking area based on the cleaning robot deviating to the left and the graphic identifier located on the front surface of the cleaning robot;

controlling the cleaning robot to turn right at the steering angle and travel forward at the first distance, and then turn left at the steering angle and travel back at the second distance to travel to the second docking area based on the cleaning robot deviating to the left and the graphic identifier located on the rear surface of the cleaning robot;

controlling the cleaning robot to turn left at the steering angle and travel back at the first distance, and then turn right at the steering angle and travel forward at the second distance to travel to the second docking area based on the cleaning robot deviating to the right and the graphic identifier located on the front surface of the cleaning robot; and controlling the cleaning robot to turn left at the steering angle and travel forward at the first distance, and then turn right at the steering angle and travel back at the second distance to travel to the second docking area based on the cleaning robot deviating to the right and the graphic identifier located on the rear surface of the cleaning robot, wherein the first distance is determined by an equation set forth as E/sin F, and the second distance is determined by an equation set forth as E/tgF, in which F represents the steering angle.

6. The docking method of claim 5, wherein, prior to the cleaning robot second control step, the docking method further comprises a cleaning robot data release step of sending the deviation direction of the cleaning robot and a location of the graphic identifier on the cleaning robot to a data processing system, and a third instruction sending step of sending a third travel instruction to the cleaning robot through the data processing system.

7. The docking method of claim 1, wherein, prior to the cleaning robot first control step, the docking method further comprises an in-position signal sending step of sending an in-position signal indicating the docking robot arrives in position to a data processing system, and a second instruction sending step of sending a second travel instruction by the data processing system to the cleaning root.

8. A docking method, comprising:

a docking area setting step of setting a first docking area located outside each of a plurality of cleaning areas and adjoining a side of the cleaning area, and setting a second docking area located in the cleaning area, adjoining the side of the cleaning area, and corresponding to the first docking area;

an approaching cleaning area step of dispatching a docking robot to the first docking area adjoining the cleaning area;

a docking platform initial adjustment step of adjusting an angle and/or a height of a docking platform to allow an upper surface of the docking platform to be flush with an upper surface of a panel located in the cleaning area, and allow an entrance of a docking apparatus to face the second docking area;

a cleaning robot first control step of controlling a cleaning robot to pass through the entrance from the first docking area to the second docking area, or from the second docking area to the first docking area;

a docking platform further adjustment step of adjusting the angle and/or the height of the docking platform to make the upper surface of the docking platform be in a horizontal state; and a leaving cleaning area step of controlling the docking robot to leave the first docking area;

wherein after the docking platform initial adjustment step, the docking method further comprises a mating step of mating the docking platform to the second docking area of the cleaning area, and after the docking platform further adjustment step, the docking method further comprises an undocking step of separating the docking platform from the second docking area of the cleaning area;

wherein in the mating step, a bridge board provided by the docking robot extends from the docking robot to connect the upper surface of the docking platform to the upper surface of the panel in the cleaning area, and in the undocking step, the bridge board is retracted so that the upper surface of the docking platform is separated from the upper surface of the panel in the cleaning area.

9. The docking method of claim 8, wherein, prior to the cleaning robot first control step, the docking method further comprises an in-position signal sending step of sending an in-position signal indicating the docking robot arrives in position to a data processing system, and a second instruction sending step of sending a second travel instruction by the data processing system to the cleaning root.

\* \* \* \* \*